Patented Jan. 3, 1928.

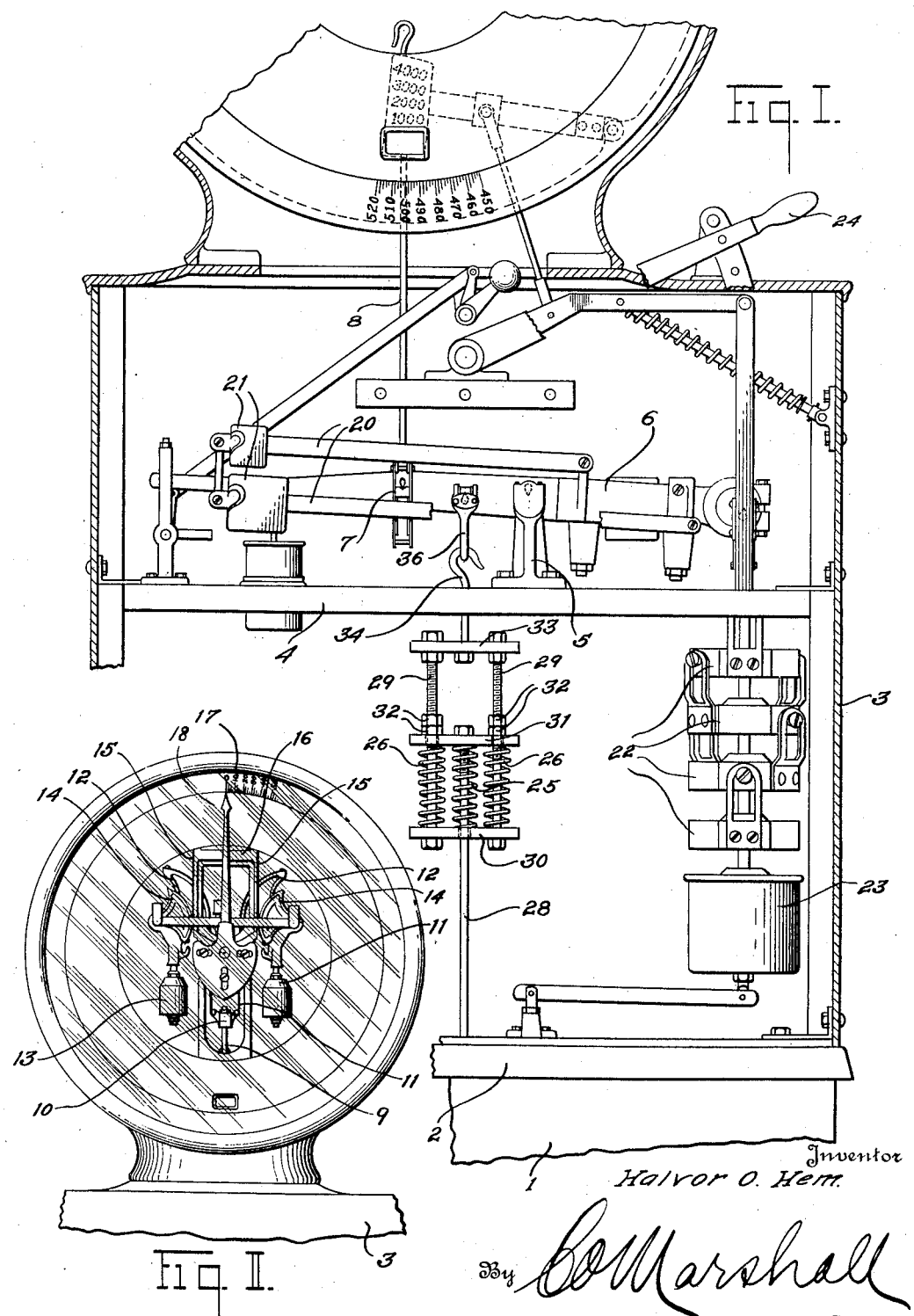

1,654,648

UNITED STATES PATENT OFFICE.

HALVOR O. HEM, OF TOLEDO, OHIO, ASSIGNOR TO TOLEDO SCALE COMPANY, OF TOLEDO, OHIO, A CORPORATION OF NEW JERSEY.

WEIGHING SCALE.

Application filed September 13, 1924. Serial No. 737,560.

This invention relates to weighing scales, and more particularly to scales which are subject to shocks when heavy loads are dropped upon their platforms.

One of the principal objects of my invention is to provide a scale which incorporates a shock absorbing means for preventing injury to the delicate weighing mechanism when loads are dropped upon the platform.

Another object is to provide a shock absorbing means for delicate weighing mechanisms which remains inactive throughout the weighing range of the scale except when a heavy load is thrown upon the platform or the scale subjected to shock.

Still another object is the provision of a shock absorbing means for weighing scales which is capable of incorporation in practically all types of scales without necessitating material changes in their mechanism.

Still another object is the provision of a resilient shock absorbing means which is simple and sturdy in construction and easy and inexpensive to manufacture and which is adjustable within wide limits and is therefore adaptable to various sizes of scales.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a sectional elevational view of a portion of a scale of the so-called heavy capacity type embodying my invention; and Figure II is an elevational view of the automatic load-counterbalancing mechanism employed in this scale.

Referring to the drawings in detail, I have illustrated my invention as incorporated in a weighing scale of the so-called heavy capacity dormant type. However, it is to be clearly understood that my device may be applied to other types of scales. As my invention does not reside in the weighing mechanism per se, I will only describe the scale in such detail as to show the application of my device thereto.

The weighing scale consists substantially of a base structure 1 which houses and supports platform lever mechanism (not shown) upon which is mounted a load-receiving platform 2. Upon the rear end of the base 1 is erected a substantially rectangular frame or cabinet 3 provided with a shelf or bridge member 4 which supports a stand or fulcrum support 5 upon which is pivotally mounted the lever 6. The frame 3 is surmounted by a watch-case-shaped housing within which is supported the automatic load-counterbalancing mechanism. The lever 6 is connected by means of a stirrup 7 and links 8 and 9 to a yoke 10 fixed to the lower extremities of flexible metallic ribbons 11. The ribbons 11 are fixed to and adapted to overlie the curved surfaces of power sectors 12 forming a part of the pendulum load-counterbalancing structure. The pendulums 13 are also provided with fulcrum sectors 14 which are suspended by metallic ribbons 15 from a frame 16, and the pendulums are adapted to swing upwardly and outwardly to counterbalance the load to be weighed. The weight of the load is indicated on a suitably graduated chart 17 over which an indicator hand 18 swings, the hand being driven by means of rack and pinion mechanism (not shown). This portion of the scale mechanism is clearly described and claimed in the patent to Hapgood No. 1,203,611, dated November 7, 1916.

The lever 6 is provided with a pair of beams 20 on which are slidably mounted the poises 21 for increasing the capacity of the scale. Another capacity increasing device is provided comprising a plurality of unit weights 22 which may be deposited upon a member 23 suspended from one end of the lever 6 by means of an operating handle 24. As such devices form no part of my invention, they will not be more fully described.

Interposed between the platform lever system and the delicate pendulum and lever mechanism is a shock absorbing device comprising three expansive coil springs 25, 26 and 26. The spring 25 surrounds the rod 28 which is connected to the platform lever mechanism, while the springs 26 surround the rods 29 which are connected to the load-counterbalancing mechanism of the scale.

Slidably mounted upon the rod 28 below the spring 25 and secured to the lower ends of the rods 29 is a block 30, and slidably mounted upon the rods 30 above the springs 26 and secured to the upper end of the rod 28 is a block 31. The rods 29 are threaded and each of them carries a pair of lock nuts 32 by means of which the block 31 can be forced toward the block 30 to a point at which the expansive force of the springs will prevent further compression by any pull upon the rod 28 not greater than that exerted by a capacity load resting upon the platform. A bar 33 connecting the upper ends of the rods 29 is fixed to a hook member 34 connected to a stirrup 36 which is pivotally connected to the lever 6.

If the springs are adjusted to a tension capable of withstanding without further compression a load of 100 lbs., the rod 28, the shock absorbing mechanism and the hook 34 will be moved as a unit by a load exerting a pull of 100 lbs., but if a load be thrown upon the platform the resulting shock will be absorbed by the springs and injury to the delicate pendulum mechanism and pivot edges prevented. The interposition of such springs will have no effect on the weighing qualities of the scale, as in weighing the downward force exerted on the rod is the same as the force exerted on the hook rod 34 and other parts of the shock absorbing mechanism.

It is apparent that by moving the lock nuts 32 along the rods 29 the device may be adjusted to adapt it to scales of varying capacities and that additional adjustment may be effected by substituting springs of different sizes.

The embodiment of my invention herein shown and described is to be regarded as illustrative only, and it is to be understood that the invention is susceptible to variation, modification and change within the spirit and scope of the subjoined claims.

Having described my invention, I claim:

1. In a weighing scale, in combination, a frame, lever mechanism supported on said frame, automatic load-counterbalancing mechanism connected to said lever mechanism, a load-receiving platform, a connection between said platform, lever and load-counterbalancing mechanisms, said connection including a shock absorbing element comprising a spring, and means for adjusting the tension on said spring.

2. In a weighing scale, in combination, a frame, lever mechanism supported on said frame, pendulum load-counterbalancing mechanism connected to said lever mechanism, a load-receiving platform, a connection between said platform, lever and load-counterbalancing mechanisms, said connection including a shock absorbing element comprising a spring, and means for adjusting the tension on said spring.

3. In a weighing scale, in combination, lever mechanism, a load-receiving platform, a connection between said lever mechanism and said platform, said connection including a resilient member, and means whereby said resilient member will not yield under loads within the capacity of the scale except when subjected to shock.

4. In a device of the class described, in combination, automatic load-counterbalancing mechanism, a load-receiving platform, a connection between said load-counterbalancing mechanism and said platform including a resilient member, and means whereby said resilient member will not yield during weighing operations except when subjected to shock.

5. In a device of the class described, in combination, pendulum load-counterbalancing mechanism, lever mechanism, a connection between said pendulum and lever mechanisms, a load-receiving platform, a connection between said pendulum and lever mechanisms and said platform including a spring, and means for adjusting the tension on said spring whereby said spring may be set not to yield during weighing operations but to yield under shock.

HALVOR O. HEM.